(12) United States Patent
Arata et al.

(10) Patent No.: US 10,814,752 B2
(45) Date of Patent: Oct. 27, 2020

(54) VEHICLE SEAT

(71) Applicant: TACHI-S CO., LTD., Akishima-shi, Tokyo (JP)

(72) Inventors: Kazuyoshi Arata, Akishima (JP); Takao Tsutsui, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/366,438

(22) Filed: Mar. 27, 2019

(65) Prior Publication Data

US 2019/0375316 A1 Dec. 12, 2019

(30) Foreign Application Priority Data

Jun. 11, 2018 (JP) ................................. 2018-110865

(51) Int. Cl.
*B60N 2/56* (2006.01)
*B60N 2/58* (2006.01)
*B60N 2/70* (2006.01)

(52) U.S. Cl.
CPC ......... *B60N 2/5657* (2013.01); *B60N 2/7017* (2013.01)

(58) Field of Classification Search
CPC ............................ B60N 2/5657; B60N 2/7017
USPC .... 297/180.13, 180.14, 452.41, 452.42, 452, 297/45, 452.46, 452.47
See application file for complete search history.

(56) References Cited

U.S. PATENT DOCUMENTS

| | | | | |
|---|---|---|---|---|
| 5,924,766 A * | 7/1999 | Esaki | ........................ | A47C 7/74 297/180.13 |
| 6,062,641 A * | 5/2000 | Suzuki | ....................... | A47C 7/74 297/180.14 X |
| 6,929,322 B2 * | 8/2005 | Aoki | ................... | B60H 1/00285 297/180.13 |
| 7,070,232 B2 * | 7/2006 | Minegishi | ................. | A47C 7/18 297/180.14 |
| 7,083,227 B2 * | 8/2006 | Brennan | ................... | A47C 7/74 297/180.14 |
| 7,478,869 B2 * | 1/2009 | Lazanja | ................ | B60N 2/5635 297/180.13 |
| 7,506,938 B2 * | 3/2009 | Brennan | ................... | A47C 7/74 297/180.13 |
| 7,862,113 B2 * | 1/2011 | Knoll | .................... | B60N 2/5635 297/180.14 |
| 8,408,641 B2 * | 4/2013 | Lem | ...................... | B60N 2/5664 297/180.13 |

(Continued)

FOREIGN PATENT DOCUMENTS

| | | |
|---|---|---|
| JP | 2003-165325 A | 6/2003 |
| JP | 2014-136423 A | 7/2014 |

*Primary Examiner* — Rodney B White
(74) *Attorney, Agent, or Firm* — SGPatents PLLC (57) ABSTRACT

A vehicle seat including a seat cushion and a seat back is constructed such that at least one of the seat cushion or the seat back includes: a blower fan, a blower chamber defining a ventilation passage of air sent from the blower fan, and a urethane pad sandwiching the blower chamber and formed with a plurality of vent holes allowing the air from the blower chamber to flow there-through. The ventilation passage in the blower chamber is formed across the full width of the blower chamber, and the blower chamber is formed with through-holes having a diameter smaller than that of the vent holes of the urethane pad and in a manner that the plurality of through-holes are overlapped with one vent hole in the urethane pad.

13 Claims, 8 Drawing Sheets

(56) References Cited

U.S. PATENT DOCUMENTS

| | | | | |
|---|---|---|---|---|
| 8,757,726 B2* | 6/2014 | Oota | ................ | B60N 2/7094 |
| | | | | 297/452.42 |
| 8,827,372 B2* | 9/2014 | Yoon | ................ | B29C 44/1271 |
| | | | | 297/452.42 |
| 8,919,874 B2* | 12/2014 | Ota | ................ | B60N 2/5642 |
| | | | | 297/180.13 |
| 10,358,062 B2* | 7/2019 | Arata | ................ | B60N 2/5657 |
| 2003/0102699 A1 | 6/2003 | Aoki et al. | | |
| 2003/0214160 A1* | 11/2003 | Brennan | ............ | B60N 2/5657 |
| | | | | 297/180.14 |
| 2005/0285438 A1* | 12/2005 | Ishima | ................ | B60N 2/5635 |
| | | | | 297/452.42 |
| 2006/0175877 A1* | 8/2006 | Alionte | ............ | B60N 2/5635 |
| | | | | 297/180.14 |
| 2008/0073966 A1* | 3/2008 | Ali | ................ | B60N 2/70 |
| | | | | 297/452.46 |
| 2009/0079236 A1* | 3/2009 | Itou | ................ | B60N 2/5635 |
| | | | | 297/180.1 |
| 2011/0258781 A1* | 10/2011 | Kawasaki | ............ | B60N 2/7017 |
| | | | | 5/652.1 |
| 2012/0261974 A1* | 10/2012 | Yoshizawa | ............ | B60N 2/5642 |
| | | | | 297/452.42 |
| 2013/0264857 A1* | 10/2013 | Ota | ................ | A47C 7/744 |
| | | | | 297/452.47 |
| 2015/0291070 A1* | 10/2015 | Kitajima | ............ | B60N 2/7017 |
| | | | | 297/452.48 X |
| 2015/0314716 A1* | 11/2015 | Zimmann | ............ | B60N 2/5664 |
| | | | | 297/452.42 X |
| 2018/0022252 A1* | 1/2018 | Arata | ................ | B60N 2/56 |
| | | | | 297/452.42 |
| 2019/0283527 A1* | 9/2019 | Kawashima | ............ | A47C 7/74 |

* cited by examiner

FIG. 14 ical description of preferred embodiments of the invention, as illustrated in the accompanying drawings.

VEHICLE SEAT

BACKGROUND

The present invention relates to a vehicle seat equipped with a blower fan.

Some of the vehicle seats is equipped with a blower fan such as to perform a function of adjusting the temperature of a seating surface by allowing air flow from the blower fan through a duct formed in a pad and discharging the air from a seat cushion surface or a seat back surface.

A seat back having such a structure is set forth in Japanese Unexamined Patent Application Publication No. 2014-136423, for example, which discloses a method of manufacturing seat pad containing duct. As defined in Claim 1 of this patent literature, the method of manufacturing a seat pad having an air distribution duct 2 embedded therein includes the steps of: setting the air distribution duct 2 with an air inlet port 26e and an air outlet port 25a in a lower die 7a of a foam molding die 7; closing the air inlet port 26e in an upward position by means of a sealing tape 4; injecting a foam material m, followed by mold closing; completing integrated foamed molding of a seat pad 1 having the duct 2 with the sealing tape 4 inserted therein and demolding the seat pad; and subsequently opening the air inlet port 26e by removing the sealing tape 4.

Further, a structure where an exhaust fan sends air to a cushion member via a mounting bracket is disclosed in Japanese Unexamined Patent Application Publication No. 2003-165325.

One of the needs for vehicle seat is to provide the largest possible in-vehicle space by slimming down the seat. In slim seat design, the blower fan mounted in the seat back for air conditioning the seat back constitutes a factor determining the thickness of the seat.

As described in Japanese Unexamined Patent Application Publication No. 2014-136423, the air sent from the air-conditioning blower fan mounted in the seat back flows through a plurality of ducts branched in the seat back and is discharged to the seat back surface through air outlets formed in the seat pad.

In this structure, the ducts are formed with long thin duct lines such as to permit the air to be discharged from different areas of the seat back. The blower fan must have a relatively large capacity in order to permit even distal end portions of such long thin duct lines to blow sufficient air through the air outlets formed in the seat pad.

In a case where the blower fan having such a large capacity is employed, the vehicle seat has the structure where the exhaust fan sends air to the cushion member through the mounting bracket, as described in Japanese Unexamined Patent Application Publication No. 2003-165325. The dimension (thickness) of the blower fan constitutes one factor determining the thickness of the seat in the slim seat design.

SUMMARY

It is an object of the invention to provide a vehicle seat which addresses the above-described problem of prior art and permits the use of a blower fan of a relatively small capacity so as to enable the slim seat design.

According to an aspect of the invention for achieving the above object, a vehicle seat which includes a seat cushion and a seat back has an arrangement wherein either one of the seat cushion and the seat back includes: a blower fan; a blower chamber defining a ventilation passage of air sent from the blower fan; and a urethane pad sandwiching the blower chamber and formed with a plurality of vent holes for allowing the air from the blower chamber to pass therethrough, the ventilation passage in the blower chamber is formed across the full width of the blower chamber, and the blower chamber is formed with through-holes which have a diameter smaller than that of the vent holes of the urethane pad and are formed in a manner that the plurality of through-holes are overlapped with one vent hole in the urethane pad.

According to another aspect of the invention for achieving the above object, a vehicle seat which includes a seat cushion and a seat back has an arrangement wherein the seat cushion and the seat back include: a blower fan; and a blower chamber defining a ventilation passage of air sent from the blower fan, the ventilation passage of the blower chamber is formed across the full width of the blower chamber, the blower chamber includes: an upper fabric portion disposed on a side close to an occupant seated on the vehicle seat; a lower fabric portion disposed on a side farther from the occupant than the upper fabric portion and in a face-to-face relation with the upper fabric portion; and a frame for fixing the upper fabric portion and the lower fabric portion on a periphery thereof, and the upper fabric portion is formed of a fabric permeable to air while the lower fabric portion is formed of a fabric less permeable to air than the upper fabric portion.

According to the invention, the ventilation passage formed in the seat for discharging the air sent from the blower fan from a seat surface is so configured as to minimize as much as possible air resistance and to discharge the air substantially from the entire surface of the ventilation passage. This configuration not only enables the slim seat design by employing the small slim blower fan having a smaller capacity than before, but also provides a greater freedom in designing the position to discharge the air from the seat surface.

These and other objects, features and advantages of the invention will be apparent from the following more particular description of preferred embodiments of the invention, as illustrated in the accompanying drawings.

DESCRIPTION OF THE PREFERRED EMBODIMENTS

According to an aspect of the invention, the ventilation passage (equivalent to the prior-art duct) formed in the seat for discharging the air sent from the blower fan from the seat surface is so configured as to minimize as much as possible the air resistance, thus enabling the slim seat design and the reduction of capacity of the blower fan. Namely, the invention enables the use of a blower fan smaller and thinner than the conventional blower fans.

According to another aspect of the invention, the ventilation passage is formed with a multitude of small holes substantially in its entire surface close to the seat surface so that a multitude of portions can be defined as positions to discharge the air sent from the blower fan from the seat surface. This structure provides not only greater freedom in designing the position to discharge the air from the seat surface but also a greater comfortableness by virtue of air blown through the seat.

The embodiments of the invention will hereinbelow be described with reference to the accompanying drawings. It is noted that the invention is not limited to the following embodiments described below but can include a variety of modifications. The embodiments to be described as below are the detailed illustrations to clarify the invention. The invention is not necessarily limited to those including all the components described herein. Some component of one embodiment can be replaced by some component of another embodiment. Further, some component of one embodiment can be added to the arrangement of another embodiment. A part of the arrangement of each embodiment permits addition of some component of another embodiment, the omission thereof or replacement thereof.

First Embodiment

Figure 1:
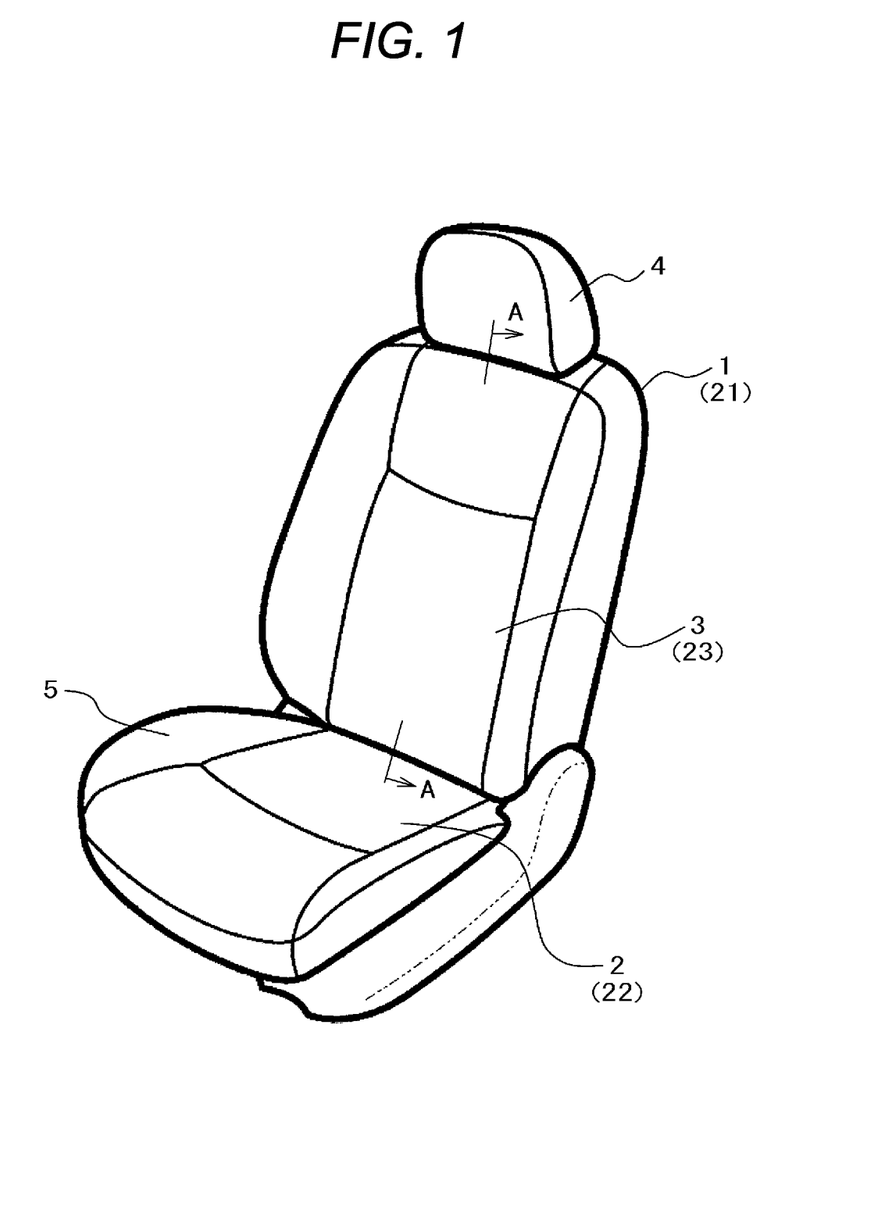
FIG. 1 is a perspective view showing an external appearance of a vehicle seat according to the invention.

An external appearance of a vehicle seat 1 according to the invention is shown in FIG. 1. The vehicle seat 1 according to the invention includes: a seat cushion 2 for an occupant to be seated thereon; a seat back 3 which the occupant seated on the seat cushion 2 rests his/her back on; and a head rest 4 supporting a head of the occupant. The seat cushion 2 is formed with side supports 5 on opposite sides thereof.

Figure 2:
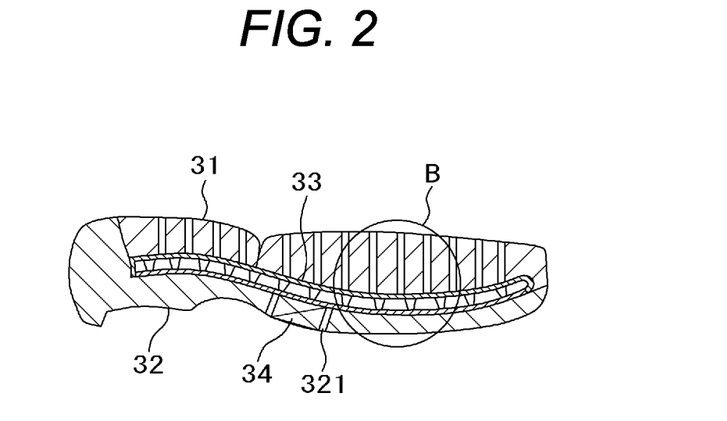
FIG. 2 is a sectional view of a seat back of the vehicle seat according to a first embodiment of the invention, taken on the line A-A in FIG. 1.

FIG. 2 is a sectional view of the seat back 3 taken on the line A-A in FIG. 1. FIG. 2 shows a simplified cross-section structure of a urethane pad portion constituting the seat back according to the embodiment by omitting the other components of the seat back.

In the structure shown in FIG. 2, an upper urethane pad of the seat back 3 on which the occupant rests his/her back is indicated at 31, while a lower urethane pad is indicated at 32. A blower chamber 33 is sandwiched between the upper urethane pad 31 and the lower urethane pad 32. The lower urethane pad 32 is formed with a hole-like window 321, through which a blower fan 34 is connected to the blower chamber 33.

Figure 3:
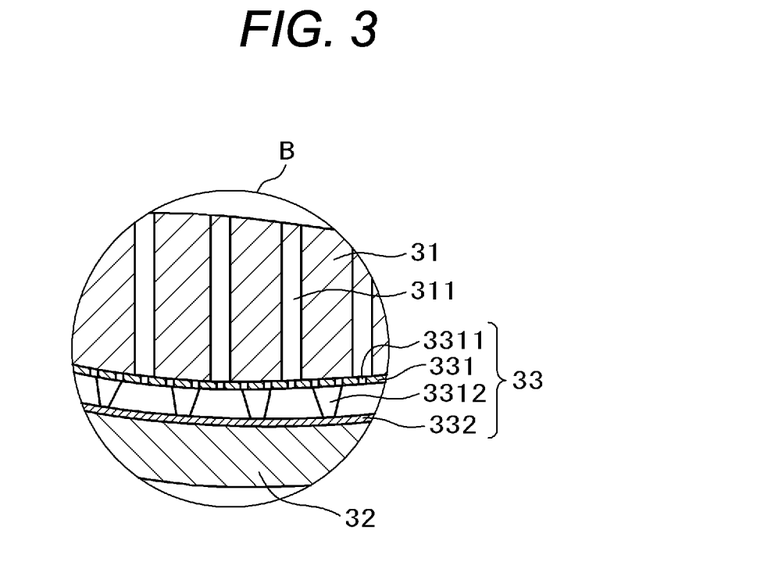
FIG. 3 is a sectional view of the seat back of the vehicle seat according to the first embodiment hereof, showing a B area of FIG. 2 in enlarged dimension.

FIG. 3 shows the details of a circled area B in FIG. 2. The blower chamber 33 sandwiched between the upper urethane pad 31 and the lower urethane pad 32 is defined by an upper chamber portion 331 and a lower chamber portion 332. A fixed distance (10 to 20 mm) is maintained between the upper chamber portion 331 and the lower chamber portion 332 by means of bosses 3312 formed integrally with the upper chamber portion 331.

Figure 4:
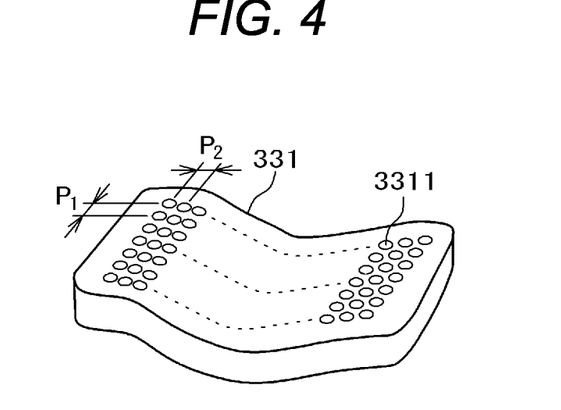
FIG. 4 is a perspective view of an upper chamber portion of a blower chamber of the seat back of the vehicle seat according to the first embodiment hereof.

A multitude of through-holes 3311 having a diameter of 1 to 5 mm are formed in the upper chamber portion 331 at pitches of 2 to 8 mm ($P_1$, $P_2$: see FIG. 4). The upper urethane pad 31 is formed with a plurality of vent holes 311 as through-holes (diameter: 10 to 20 mm). The vent holes 311 and the through-holes 3311 are formed in a manner that the vent hole 311 of the upper urethane pad 31 is overlapped with more than one of the multitude of through-holes 3311 formed in the upper chamber portion 331. This ensures that a space communicating the inside of the blower chamber 33 with a surface of the upper urethane pad 31 is formed.

It is noted here that the through-hole 3311 may have a circular or oval cross section. Further, the cross-sectional shape of the through-hole may be a polygon such as triangle, square, pentagon or hexagon. The cross-sectional shape and size of the through-hole 3311 may be changed depending upon the location thereof.

FIG. 4 is a perspective view of the upper chamber portion 331. The upper chamber portion 331 is not configured to include the plurality of branched ventilation passages as set forth in Unexamined Patent Application Publication No. 2014-136423, but to form a wide surface extending across the width of the upper chamber portion 331 and covering an area where all the vent holes of the upper urethane pad 31 are formed.

The upper chamber portion 331 is formed with the multitude of through-holes 3311 substantially on the entire surface thereof. The multitude of through-holes 3311 formed in the upper chamber portion 331 are partially overlapped with the vent holes 311 formed in the upper urethane pad 31, as described with reference to FIG. 3. While FIG. 4 shows the example where the multitude of through-holes 3311 are arranged in a matrix form, or vertically arranged at the pitch $P_1$ and horizontally arranged at the pitch $P_2$, the embodiment is not limited to this. The through-holes may be arranged at random or arranged at pitches varying from place to place.

The upper chamber portion 331 has a curved shape which conforms to a back contour of the seated occupant resting his/her back on the seat back 3. Further, the upper chamber portion 331 shown in FIG. 4 is formed with the bosses 3312, such as shown in FIG. 3, at a plurality of locations on the back side thereof.

It is noted that the bosses 3312 may be formed on the lower chamber portion 332. Alternatively, the bosses 3312 may be alternately formed on the upper chamber portion 331 and the lower chamber portion 332. All the bosses 3312 need not have the same cross-sectional shape. For example, the boss 3312 at an area subjected to a relatively large force may have a large sectional area such that the boss can maintain the distance between the upper chamber portion 331 and the lower chamber portion 332. On the other hand, the boss at an area subjected to a relatively small force may be reduced in the sectional area such as to exhibit a smaller resistance against the flowing air.

A surface of the upper urethane pad 31 that abuts on a top surface of the upper chamber portion 331 is formed in substantially the same curved shape as that of the top surface of the upper chamber portion 331.

Figure 5:
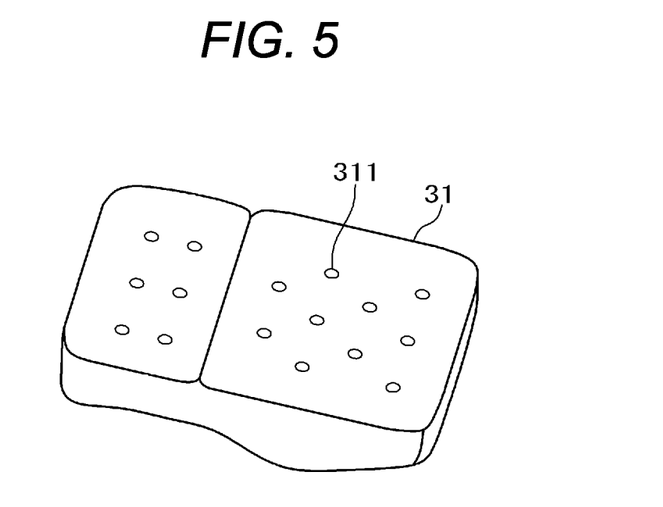
FIG. 5 is a perspective view of an upper urethane pad of the seat back of the vehicle seat according to the first embodiment hereof.

FIG. 5 is a perspective view of the upper urethane pad 31. The upper urethane pad 31 is formed with the multitude of vent holes 311 as the through-holes for blowing the air sent from the blower fan 34 onto the back of the seated occupant.

The vent holes 311 as the through-holes formed in the upper urethane pad 31 are defined to have a larger diameter than that of the through-holes 3311 and to have a pitch larger than pitches $P_1$, $P_2$ of the multitude of through-holes 3311 formed in the upper chamber portion 331 of the blower chamber 33 such that the vent holes 311 of the upper urethane pad 31 are overlapped with any ones of the multitude of through-holes 3311 formed in the upper chamber portion 331. Thus, the space communicating the inside of the blower chamber 33 with the surface of the upper urethane pad 31 can be secured.

As just described, the multitude of through-holes 3311 are formed in the upper chamber portion 331 of the blower chamber 33 while the vent holes 311 in the upper urethane pad 31 are so formed as to have the larger diameter than the pitches $P_1$, $P_2$ of the multitude of through-holes 3311 so that the arrangement of the vent holes 311 formed in the upper urethane pad 31 can be arbitrarily defined within the area where the through-holes 3311 of the upper chamber portion 331 are formed. This results in the increase in freedom in position design of the vent holes 311.

Figure 6:
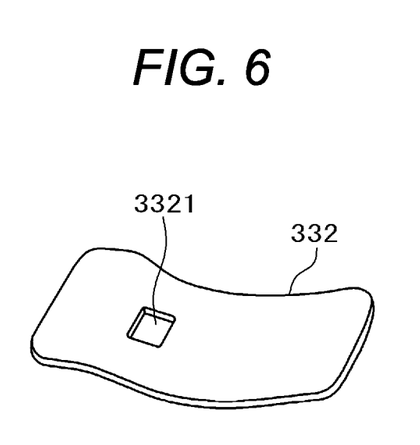
FIG. 6 is a perspective view of a lower chamber portion of the blower chamber of the seat back of the vehicle seat according to the first embodiment hereof.

FIG. 6 is a perspective view of the lower chamber portion 332. The lower chamber portion 332 has substantially the same curved shape as that of the upper chamber portion 331 and is formed with a hole 3321 for mounting the blower fan.

Figure 7:
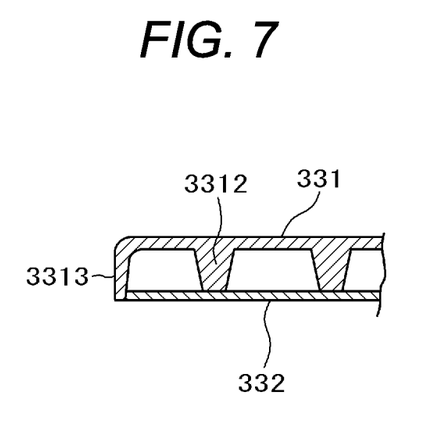
FIG. 7 is a sectional view of an area near an end of the blower chamber of the seat back of the vehicle seat according to the first embodiment hereof.

The upper chamber portion 331 and the lower chamber portion 332 are resin parts which are formed by molding. FIG. 7 shows an area near ends of the upper chamber portion 331 and the lower chamber portion 332 combined together. An end 3313 of the upper chamber portion 331 extends toward the lower chamber portion 332 and is configured to be fitted on the lower chamber portion 332. In the state where the lower chamber portion 332 is fitted in the upper chamber portion 331, distal ends of the plurality of bosses 3312 formed on the upper chamber portion 331 abut on the lower chamber portion 332.

A ventilation portion between the upper chamber portion 331 and the lower chamber portion 332 is formed across the full width of the upper chamber portion 331 planarly covering a plurality of regions formed with the vent holes 311 of the upper urethane pad 31 and across the full width of the lower chamber portion 332. Namely, the ventilation portion is formed across the full width of the blower chamber 33, thus securing a relatively large sectional area. This structure can achieve a smaller ventilation resistance than the structures set forth in Japanese Unexamined Patent Application Publication No. 2014-136423 or 2003-165325.

In the ventilation portion between the upper chamber portion 331 and the lower chamber portion 332, the fixed distance between the upper chamber portion and the lower chamber portion is maintained by the plurality of bosses 3312 formed on the upper chamber portion 331. Although the seated occupant rests his/her back on the seat back 3, therefore, the space (the ventilation portion) defined between the upper chamber portion 331 and the lower chamber portion 332 is not substantially squished. Accordingly, the structure of the embodiment can maintain the small ventilation resistance as compared with the conventional structure employing the ventilation duct having a relatively small sectional area. Hence, the embodiment can employ the smaller blower fan 34 than that used in the conventional structure.

In this manner, the embodiment is adapted to employ the smaller blower fan 34 than that of the conventional structure. Hence, the embodiment permits the blower fan 34 to be mounted to the upper chamber portion 332 directly or by means of a mounting member, negating the need for using such a mounting bracket as set forth in Japanese Unexamined Patent Application Publication No. 2003-165325.

Figure 8:
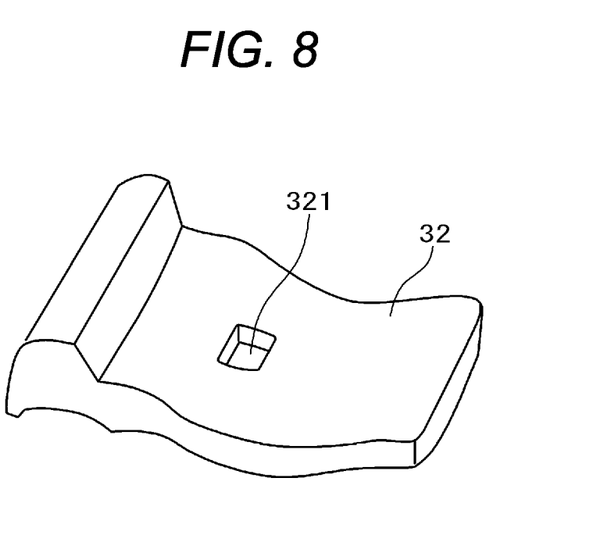
FIG. 8 is a perspective view of a lower urethane pad of the seat back of the vehicle seat according to the first embodiment hereof.

FIG. 8 is a perspective view of the lower urethane pad 32. An upper surface of the lower urethane pad 32 is formed in the same shape as that of a lower surface of the lower chamber portion 332. The lower urethane pad 32 is formed with the window 321 so that the lower urethane pad does not interfere with the blower fan 34 mounted to the lower chamber portion 332.

In this manner, the embodiment is adapted to permit the blower fan 34 to be directly mounted to the lower chamber portion 332 as accommodated in the window 321 formed in the lower urethane pad 32. Accordingly, the blower fan 34 is embedded in the lower urethane pad 32, as illustrated in the sectional view of FIG. 2. Thus, the seat back is slimmed down at least by the thickness of the lower urethane pad 32.

Figure 9:
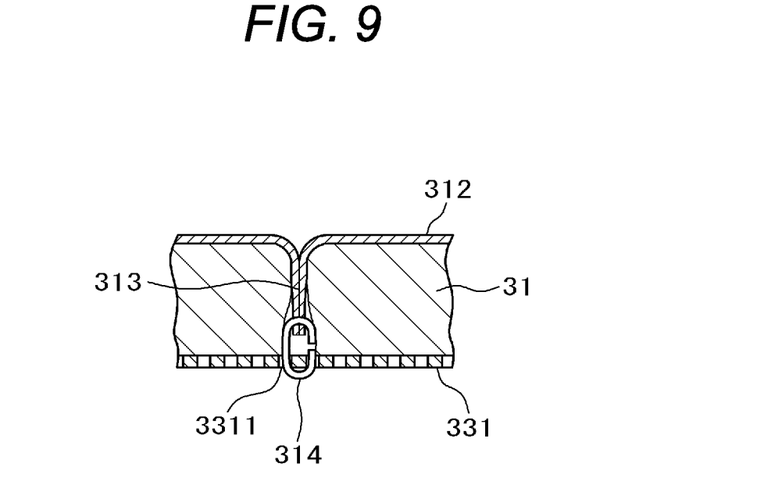
FIG. 9 is a fragmentary sectional view of the seat back of the vehicle seat according to the first embodiment hereof, showing a state where a draw-in member 314 for drawing in a sawn part 313 of a skin member 312 for covering the surface of an upper urethane pad 31 is fixed in a through-holes 3311 formed in the upper chamber portion of the blower chamber.

It is noted here, as shown in FIG. 9, that a draw-in member 314 for drawing in a sawn part 313 of a skin member 312 for covering the surface of the upper urethane pad 31 may be fixed in place by way of the through-holes 3311 formed in the upper chamber portion 331. Since a large number of through-holes 3311 are formed vertically and horizontally in the upper chamber portion at relatively small pitches $P_1$, $P_2$, the draw-in member 314 can be fixed to any position on the upper chamber portion 331 by way of the through-holes 3311 thereof. Such a structure obviates the need for a wire conventionally used for embedding the draw-in member 314 in the upper urethane pad 31.

While the foregoing embodiment is the description of the case where both the upper chamber portion 331 and the lower chamber portion 332 are molded from a resin, the upper chamber portion 331 may be replaced by a fabric woven in a relatively large meshed net. In this case, the boss 3312 is formed on the lower chamber portion 332. Further, ends of the open meshed fabric replacing the upper chamber portion 331 are adhesively bonded to the lower chamber portion 332. In this case, the vent holes 311 formed in the upper urethane pad 31 may have such a size as to cover more than one mesh of the net-like fabric replacing the upper chamber portion 331.

According to the embodiment, the arrangement of the vent holes 311 formed in the upper urethane pad 31 can be arbitrarily defined within the area where the through-holes 3311 of the upper chamber portion are formed. This leads to a greater freedom in designing the upper urethane pad 31.

According to the embodiment, the blower fan 34 can be so downsized as to be embedded in the lower urethane pad 32, enabling the slim design of the seat back 3.

Second Embodiment

A second embodiment of the invention is described with reference to FIG. 10 to FIG. 12. In this embodiment, the resin molded upper chamber portion 331 and lower chamber portion 332 of the blower chamber 33 of the first embodiment are replaced by fabric.

Figure 10:
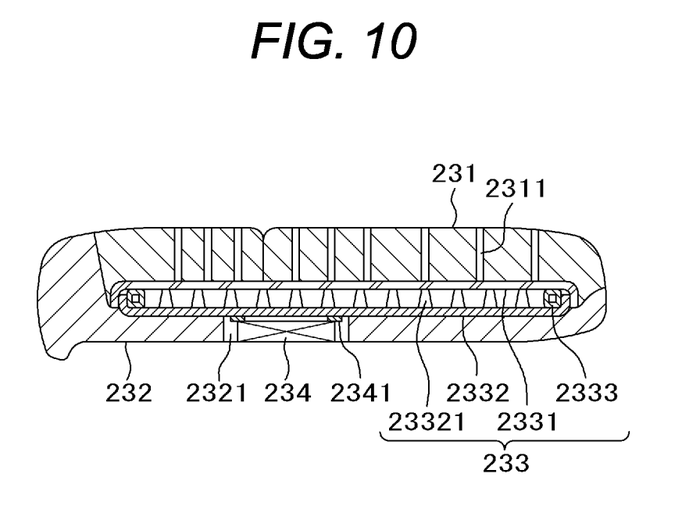
FIG. 10 is a sectional view which shows a seat back of a vehicle seat according to a second embodiment hereof and which is equivalent to the sectional view taken on the line A-A in FIG. 1.

FIG. 10 is a diagram which shows a cross-sectional structure of a seat back 23 of a vehicle seat 21 (see FIG. 1) according to the embodiment and which is equivalent to FIG. 2 showing the first embodiment. A cross-sectional structure of this embodiment differs from the cross-sectional structure of the seat back 3 of the first embodiment illustrated in FIG. 2 in that the resin molded upper chamber portion 331 and lower chamber portion 332 shown in FIG. 2 are replaced by an upper fabric portion 2331 and a lower fabric portion 2332 which are provided with a resin frame 2333 on circumferences thereof.

In the structure shown in FIG. 10, an upper urethane pad 231, a lower urethane pad 232 and a blower fan 234 are identical to the upper urethane pad 31, the lower urethane pad 32 and the blower fan 34 which were described with reference to FIG. 2 illustrating the first embodiment and hence, are not described again. The blower fan 234 is fixed to the lower fabric portion 2332 via a mounting frame 2341 by using unillustrated screws or the like. The mounting frame 2341 is fixed to the lower fabric portion 2332 as adhesively bonded thereto or as sewn thereto.

Figure 11:
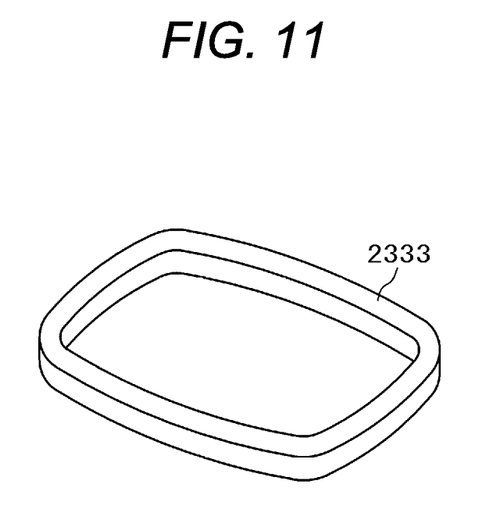
FIG. 11 is a perspective view of a resin frame of a blower chamber of a seat back of the vehicle seat according to the second embodiment hereof.

The resin frame 2333 is formed in an annular shape as shown in FIG. 11, and has a hollow cross-sectional shape as shown in FIG. 10. The upper fabric portion 2331 and the lower fabric portion 2332 have their circumferential portions adhesively bonded to an outer periphery of the resin frame 2333 and are fixed in place.

The ventilation portion between the upper fabric portion 2331 and the lower fabric portion 2332 is formed across the full width of the upper fabric portion 2331 planarly covering a plurality of regions formed with vent holes 2311 of the upper urethane pad 231 and across the full width of the lower fabric portion 2332. Namely, the ventilation portion is formed across the full width of a blower chamber 233, thus securing a relatively large sectional area. This structure can achieve a smaller ventilation resistance than the structures set forth in Japanese Unexamined Patent Application Publication No. 2014-136423 or 2003-165325.

The upper chamber portion 331 and the lower chamber portion 332 according to the first embodiment have the curved shape conforming to the back contour of the seated occupant resting his/her back on the seat back 3. In contrast, the resin frame 2333 according to the embodiment does not have a curved shape conforming to the back contour of occupant but is formed substantially along a flat plane. A metal frame can be used in place of the resin frame 2333.

Figure 12:
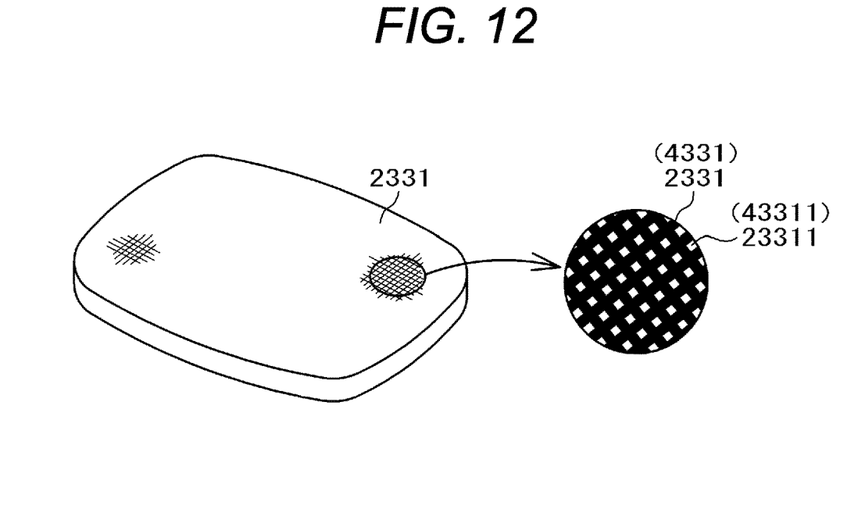
FIG. 12 is a perspective view of the blower chamber of the seat back of the vehicle seat according to the second embodiment hereof.

The upper fabric portion 2331 is formed of the fabric woven in the relatively large meshed net and permeable to air, as shown in FIG. 12. A reference number 23311 denotes net-like meshes formed in the upper fabric portion 2331. On the other hand, the lower fabric portion 2332 is formed of a fabric which has smaller meshes and less permeable to air than the upper fabric portion 2331. A multitude of resin bosses 23321 for maintaining a fixed distance between the lower fabric portion 2332 and the upper fabric portion 2331 are bonded to the lower fabric portion 2332 on its surface opposed to the upper fabric portion 2331.

According to this embodiment, a structure equivalent to the blower chamber 33 of the first embodiment described with reference to FIG. 2 is constituted by the blower chamber 233 which includes: the upper fabric portion 2331 having air permeability; the lower fabric portion 2332 which has the multitude of bosses 23321 bonded thereto and is less permeable to air than the upper fabric portion 2331; and the resin frame 2333.

According to the embodiment, the blower chamber 233 has the structure where the upper fabric portion 2331 permeable to air and the lower fabric portion 2332 less permeable to air than the upper fabric portion 2331 are bonded to the resin frame 2333 and where the bosses 23321 serve to maintain the fixed distance between the upper fabric portion 2331 and the lower fabric portion 2332. Accordingly, the air sent from the blower fan 234 is discharged to the outside through the meshes 23311 of the net-like upper fabric portion 2331 permeable to air.

Just as in the first embodiment, an upper surface of the upper fabric portion 2331 is covered by the upper urethane pad 231 formed with the vent holes 2311. The vent holes 2311 are formed to have such a size (diameter: 10 to 20 mm) as to cover more than one mesh 23311 of the net-like upper fabric portion 2331. Thus, the air discharged to the outside through the meshes 23311 of the net-like upper fabric portion 2331 flow through the vent holes 2311 to be discharged from a surface of the seat back 23 to the seated occupant.

As described with reference to FIG. 9 of the first embodiment, this embodiment may be configured such that the draw-in member 314 for drawing in the sawn part 313 of the skin member 312 covering the surface of the upper urethane pad 31 is mounted in place by using the meshes 23311 of the net-like upper fabric portion 2331. Since the net-like fabric is formed with the numerous meshes 23311 vertically and horizontally arranged at relatively small pitches, the draw-in member 314 can be mounted to the upper fabric portion 2331 at any position via the fabric meshes 23311. This configuration obviates the need for the wire used for securing the draw-in member 314 at place, which is conventionally embedded in the upper urethane pad 31.

According to the embodiment, the vent holes 2311 formed in the upper urethane pad 231 can be located at any positions on the upper fabric portion 2331. Hence, the embodiment can provide a greater freedom of design of the upper urethane pad 231.

Furthermore, the embodiment permits the resin frame 2333 to be formed substantially along a flat plane. Therefore, the embodiment can achieve the reduction of manufacture cost of the resin frame 2333 as compared to the case where the resin frame is formed in the curved shape conforming to the back contour of occupant, as described in the first embodiment.

According to the embodiment, the blower fan 234 can be so downsized as to be embedded in the lower urethane pad 232. Thus, the embodiment enables the slim design of the seat back 23.

Third Embodiment

While the second embodiment illustrates the structure where the upper surface of the upper fabric portion 2331 is covered by the upper urethane pad 231 formed with the vent holes 2311, this embodiment illustrates a structure where the upper surface of the upper fabric portion is not covered by the upper urethane pad 231.

Figure 13:
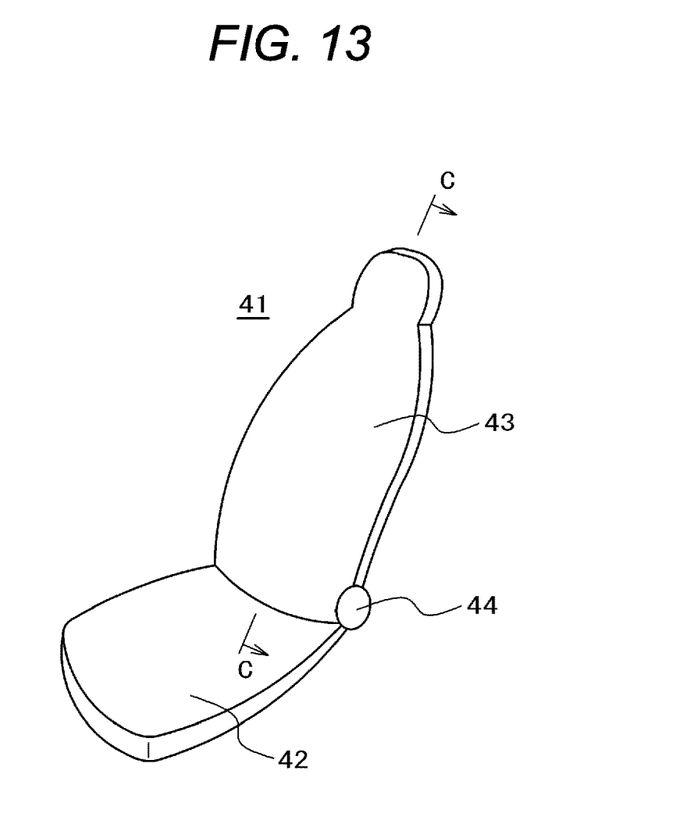
FIG. 13 is a perspective view of a vehicle seat according to a third embodiment hereof.

A structure of a vehicle seat 41 according to the embodiment is shown in FIG. 13. The vehicle seat 41 according to the embodiment includes: a seat cushion 42 for an occupant to be seated thereon; a seat back 43 which the occupant seated on the seat cushion 42 rests his/her back on; and a reclining mechanism 44 for adjusting the inclination of the seat back 43 with respect to the seat cushion 42.

Figure 14:
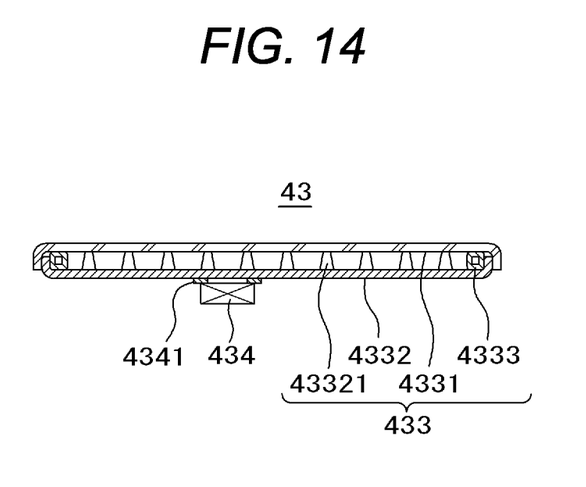
FIG. 14 is a sectional view of a blower chamber of a seat back of the vehicle seat according to the third embodiment hereof, taken on the line C-C in FIG. 13.

In the vehicle seat 41 of the embodiment, the seat back 43 has a C-C cross section configured as shown in FIG. 14. Specifically, the vehicle seat 41 according to the embodiment has a structure where the upper urethane pad 231 and the lower urethane pad 232 are removed from the blower chamber 233 described in the second embodiment.

Specifically, a blower chamber 433 of the embodiment includes: an upper fabric portion 4331; a lower fabric portion 4332 having a multitude of resin bosses 43321 bonded thereto; and a resin frame 4333. The vehicle seat is configured such that the occupant rests his/her back directly on the upper fabric portion 4331. A blower fan 434 is fixed to the lower fabric portion 4332 via a mounting frame 4341 by using unillustrated screws or the like. The mounting frame 4341 is fixed to the lower fabric portion 4332 as adhesively bonded thereto or sewn thereto.

The resin frame 4333 is formed in an annular shape in conformity to the contour shape of the seat back 43. The resin frame has a hollow cross-sectional shape similarly to the second embodiment. The upper fabric portion 4331 and the lower fabric portion 4332 have their circumferential portions adhesively bonded to an outer periphery of the resin frame 4333 and are fixed in place. Just as in the second embodiment, the resin frame 4333 according to the embodiment is not curved in conformity to the back contour of occupant but is formed substantially along a flat plane. A metal frame can be used in place of the resin frame 4333.

The upper fabric portion 433 is formed of a fabric woven in a relatively large meshed net and permeable to air the same way as that of the second embodiment described with reference to FIG. 12. In FIG. 12, a reference number 43311 denotes meshes formed in the net-like fabric of the upper fabric portion 4331. On the other hand, the lower fabric portion 4332 is formed of a fabric which has smaller meshes and is less permeable to air than the upper fabric portion 2331. A multitude of bosses 43321 for maintaining a fixed distance between the lower fabric portion 4332 and the upper fabric portion 4331 are bonded to the lower fabric portion 4332 on its surface opposed to the upper fabric portion 4331.

In this embodiment, a structure equivalent to the blower chamber 233 of the second embodiment is defined by the blower chamber 433 which includes: the upper fabric portion 4331; the lower fabric portion 4332 having the multitude of bosses 43321 bonded thereto; and the resin frame 4333.

According to the embodiment, the blower chamber 433 is constructed by bonding, to the resin frame 4333, the upper fabric portion 4331 permeable to air and the lower fabric portion 4332 less permeable to air than the upper fabric portion 4331. The blower chamber is configured such that the fixed distance between the upper fabric portion 4331 and the lower fabric portion 4332 is maintained by means of the bosses 43321. This structure is adapted to discharge the air sent from the blower fan 434 to a wider area on the side of the back of the seated occupant through the net-like meshes 43311 of the upper fabric portion 4331 permeable to air.

A ventilation portion between the upper fabric portion 4331 and the lower fabric portion 4332 is formed across the full width of the upper fabric portion 4331 and the lower fabric portion 4332. Namely, the ventilation portion is formed across the full width of the blower chamber 433, thus securing a relatively large sectional area. This structure can achieve a smaller ventilation resistance than the structures set forth in Japanese Unexamined Patent Application Publication No. 2014-136423 or 2003-165325.

While the seat back 43 according to the embodiment shown in FIG. 14 has the structure where the upper fabric portion 4331 defines the surface of the seat back 43, a surface of the upper fabric portion 4331 may also be covered by a skin material such as perforated vinyl film, artificial leather or pure hide. In this case, the perforation may be replaced by holes selectively formed at places corresponding to the vent holes 311 or 2311 formed in the upper urethane pad 31 or 231 as described in the first and the second embodiment.

The embodiment permits the resin frame 4333 to be formed substantially along the flat plane and hence, can achieve the reduction of manufacture cost of the resin frame 4333 as compared to the case where the resin frame is formed in the curved shape conforming to the back contour of occupant, as described in the first embodiment.

According to the embodiment, the urethane pad as those described in the first and second embodiments is omitted while the blower fan 434 can be so downsized as to be mounted to the lower fabric portion 4332. Therefore, the seat back 43 of this embodiment can be made thinner than those of the first and second embodiments.

While the foregoing embodiments illustrate the examples where the invention is applied to the seat backs 3, 23 and 43, the invention is also applicable to the seat cushions 2, 22, and 42.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. A vehicle seat comprising:
  a seat cushion; and
  a seat back,
  wherein at least one of the seat cushion or the seat back includes:
    a blower fan;
    a blower chamber defining a ventilation passage for air sent from the blower fan; and
    a urethane pad sandwiching the blower chamber and formed with a plurality of vent holes for allowing the air from the blower chamber to pass therethrough,
  wherein the blower chamber is formed with a plurality of through-holes which have a diameter smaller than that of the vent holes of the urethane pad and are formed in a manner that the plurality through-holes are overlapped with one vent hole in the urethane pad,
  the blower chamber includes: an upper chamber portion disposed on a side closer to an occupant seated on the vehicle seat, and a lower chamber portion disposed on a side farther from the occupant than the upper chamber portion and in a face-to-face relation with the upper chamber portion, the upper chamber portion is formed with the through-holes, and the upper chamber portion or the lower chamber portion is formed with a plurality of projected members which maintain a distance between the opposed surfaces of the upper chamber portion and the lower chamber portion.

2. The vehicle seat according to claim 1, wherein the lower chamber portion is mounted with the blower fan.

3. The vehicle seat according to claim 1, wherein the upper chamber portion and the lower chamber portion are formed by molding.

4. The vehicle seat according to claim 1, wherein the upper chamber portion and the lower chamber portion are formed of a resin into a shape conforming to a body contour of the occupant seated on the vehicle seat.

5. A vehicle seat comprising:
a seat cushion; and
a seat back,
wherein at least one of the seat cushion or the seat back includes:
a blower fan;
a blower chamber defining a ventiliation passage for air sent from the blower fan; and
a urethane pad sandwiching the blower chamber and formed with a plurality of vent holes for allowing the air from the blower chamber to pass therethrough,
wherein the blower chamber is formed with a plurality of through-holes which have a diameter smaller than that of the vent holes of the urethane pas and are formed in a manner that the plurality through-holes are overlapped with one vent hole in the urethane pad,
the blower chamber comprises: an upper fabric portion disposed on a side closer to the occupant seated on the vehicle seat, a lower fabric portion disposed on a side farther from the occupant than the upper fabric portion and in a face-to-face relation with the upper fabric portion, and a frame for fixing the upper fabric portion and the lower fabric portion on a periphery thereof, and
the upper fabric portion is formed of a fabric permeable to air, and the lower fabric portion is formed of a fabric less permeable to air than the upper fabric portion.

6. The vehicle seat according to claim 5, wherein the upper fabric portion is formed of a fabric woven in a relatively large meshed net and the lower fabric portion is formed of a relatively finely woven fabric.

7. The vehicle seat according to claim 5, wherein the lower fabric portion has a plurality of projected members bonded thereto and a distance between the opposed surfaces of the upper fabric portion and the lower fabric portion is maintained by the plurality of projected members.

8. The vehicle seat according to claim 5, wherein the lower fabric portion is mounted with the blower fan.

9. A vehicle seat comprising:
a seat cushion; and
a seat back,
wherein at least one of the seat cushion or the seat back includes:
a blower fan; and
a blower chamber defining a ventilation passage for air sent from the blower fan,
the blower chamber includes: an upper fabric portion disposed on a side closer to an occupant seated on the vehicle seat, a lower fabric portion disposed on a side farther from the occupant than the upper fabric portion and in a face-to-face relation with the upper fabric portion, and a frame for fixing the upper fabric portion and the lower fabric portion on a periphery thereof, and
the upper fabric portion is formed of a fabric permeable to air, and the lower fabric portion is formed of a fabric less permeable to air than the upper fabric portion.

10. The vehicle seat according to claim 9, wherein the ventilation passage is formed across the full width of the blower chamber.

11. The vehicle seat according to claim 9, wherein the upper fabric portion is formed of a fabric woven in a relatively large meshed net, and the lower fabric portion is formed of a relatively finely woven fabric.

12. The vehicle seat according to claim 9, wherein the lower fabric portion has a plurality of projected members bonded thereto and a distance between the opposed surfaces of the upper fabric portion and the lower fabric portion is maintained by the plurality of projected members.

13. The vehicle seat according to claim 9, wherein the lower fabric portion is mounted with the blower fan.

* * * * *